United States Patent
Lin

(10) Patent No.: US 6,795,971 B2
(45) Date of Patent: Sep. 21, 2004

(54) ADJUSTABLE POSITIONING DEVICE FOR AN OPTICAL PICKUP OF AN OPTICAL DISC APPARATUS

(75) Inventor: Hung-Jui Lin, Taipei (TW)

(73) Assignee: EPO Science & Technology, Inc., Taipei (TW)

(*) Notice: Subject to any disclaimer, the term of this patent is extended or adjusted under 35 U.S.C. 154(b) by 240 days.

(21) Appl. No.: 10/118,972

(22) Filed: Apr. 10, 2002

(65) Prior Publication Data

US 2003/0193878 A1 Oct. 16, 2003

(51) Int. Cl.[7] .................................................. G11B 21/16
(52) U.S. Cl. ........................................................ 720/679
(58) Field of Search ................................ 369/219, 249, 369/255, 263, 247

(56) References Cited

U.S. PATENT DOCUMENTS

| | | | | |
|---|---|---|---|---|
| 5,615,204 A | * | 3/1997 | Watanabe et al. ........... | 369/247 |
| 5,761,183 A | * | 6/1998 | Ikegame ...................... | 369/220 |
| 5,963,535 A | * | 10/1999 | Yamakawa et al. ......... | 369/219 |
| 5,995,478 A | * | 11/1999 | Park ............................ | 369/219 |
| 6,285,649 B1 | * | 9/2001 | Bessho et al. .............. | 369/219 |
| 6,366,551 B1 | * | 4/2002 | Wu ............................. | 369/219 |
| 6,385,160 B1 | * | 5/2002 | Jeon ............................ | 369/219 |
| 6,445,673 B2 | * | 9/2002 | Park ............................ | 369/219 |
| 6,512,734 B1 | * | 1/2003 | Chang et al. ............... | 369/219 |
| 6,636,473 B1 | * | 10/2003 | Kagaya et al. .............. | 369/249 |
| 6,639,891 B1 | * | 10/2003 | Katagiri ...................... | 369/255 |
| 6,667,945 B2 | * | 12/2003 | Omori ........................ | 369/263 |

* cited by examiner

Primary Examiner—Brian E. Miller
(74) Attorney, Agent, or Firm—Troxell Law Office PLLC

(57) ABSTRACT

An adjustable positioning device for an optical pickup of an optical disc apparatus, including four bar holders, connected to a traverse; two sliding bars, each with opposing ends inserted into a receiving chamber of two bar holders respectively; and an optical pickup head with lateral ends slidably sleeved on each of the two sliding bars respectively and which is movable back and forth on the sliding bar. The bar holder is integrally formed and provided with an elastic support capably against the sliding bar.

6 Claims, 5 Drawing Sheets

ADJUSTABLE POSITIONING DEVICE FOR AN OPTICAL PICKUP OF AN OPTICAL DISC APPARATUS

BACKGROUND OF THE INVENTION

1. Field of the Invention

The present invention relates to an optical disc apparatus, and more particularly to an adjustable positioning device for an optical pickup of an optical disc apparatus.

2. Description of Related Art

An optical pickup generally located in an optical disc apparatus is used to read data stored on an optical disc or to store data onto an optical disc. Referring to FIG. 1 and FIG. 2, a base 10 of a general optical disc apparatus is provided with three adjustable bar holders 20 and one stationary bar holder 21; an optical pickup 11, installed on an optical pickup head 12 which has both lateral ends respectively sleeved on a sliding bar 13 so that the optical pickup head 12 is movable back and forth on the sliding bar 13, to read data from or store data to the optical disc positioned above. Both ends of one sliding bar 13 are respectively connected to the stationary bar holder 21 and the opposite adjustable bar holder 20, and both ends of the other sliding bar 13 are respectively connected to two relative adjustable bar holders 20. The adjustable bar holder 20, shown in FIG. 2, comprises a top plate 22, a lower base seat 23 and a spring 24. The lower base seat 23 is provided with a receiving chamber 231 in which the spring 24 is installed and the sliding bar 13 is inserted. The top plate 22 and the lower base seat 23 are respectively fastened at lateral ends thereof to the base 10 with a fixing screw 25. An adjustable screw 26 connects the top plate 22 and the lower base seat 23 together and extends into the chamber 231 of the lower base seat 23 to push against the sliding bar 13 to adjust a height of the sliding bar 13. A turning table 14 shown as FIG. 1 is connected on the base 10 to spin an optical disc rotated. Both parallelism of the optical pickup 11 and height of the optical pickup 11 relative to the turning table 14 are adjustable when the height of each sliding bar 13 is adjusted by adjusting the adjustable screw 26 inside the three adjustable bar holders 20.

It is difficult to assemble the spring 24 with the adjustable bar holder 20, because the spring 24 is a tiny and small part that must be positioned within the receiving chamber 231 of the adjustable bar holder 20.

SUMMARY OF THE INVENTION

The invention provides an adjustable positioning device for an optical pickup of an optical disc apparatus with less working parts to reduce cost of manufacture and to make assembly easier.

BRIEF DESCRIPTION OF THE DRAWINGS

The invention is description in detail with reference to the following drawings, wherein like numerals represent like elements.

DETAILED DESCRIPTION OF THE PREFERRED EMBODIMENT

Figure 3:
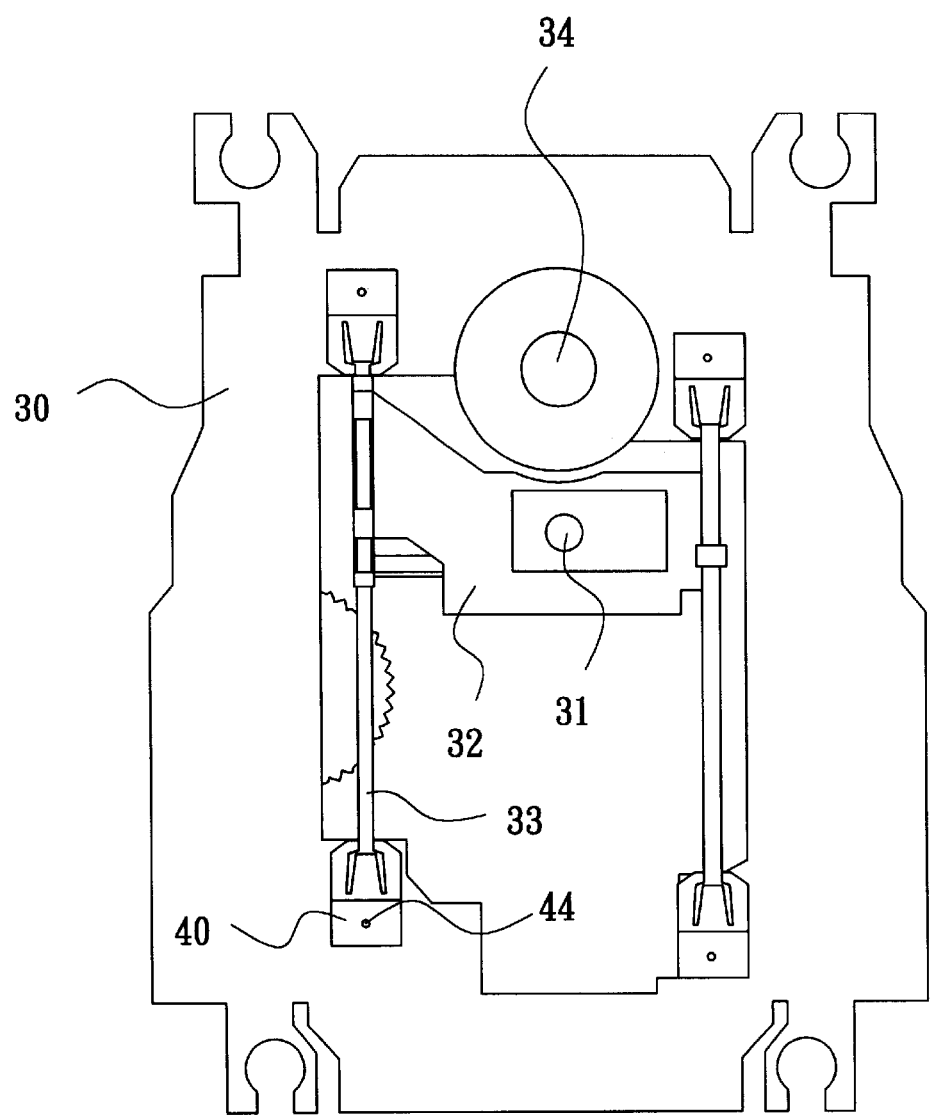
FIG. 3 is an illustrated drawing to show the structure of the traverse of the invention capably used on an optical disc apparatus.

Referring to FIG. 3, a base 30 of the optical disc apparatus is provided with four bar holders 40. An optical pickup head 32 is installed with each of two lateral ends being slidably sleeved on one sliding bar 33 respectively, and each said sliding bar 33 is connected at opposing ends thereof to each of two bar holders 40 respectively.

Figure 4:
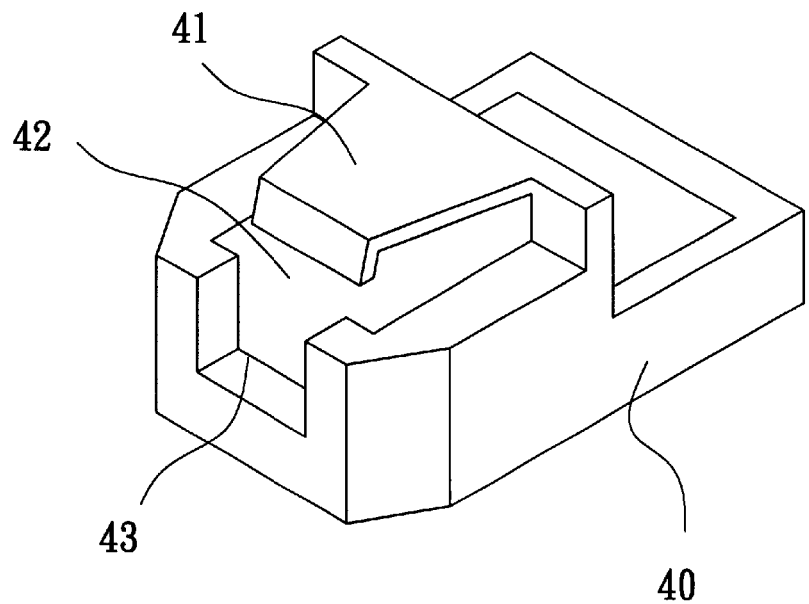
FIG. 4 is a solid diagram of a bar holder of the traverse of the invention illustrated on FIG. 3.
Figure 5:
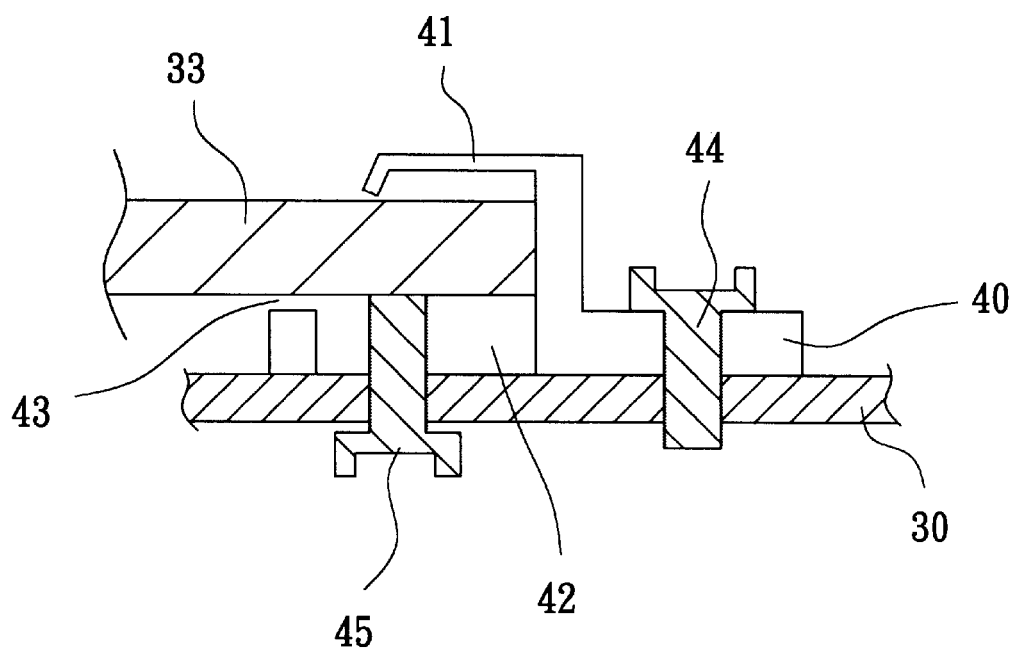
FIG. 5 is a cross-sectional drawing of a bar holder of the traverse of the invention illustrated on FIG. 3.

Referring to FIG. 4 and FIG. 5, each bar holder 40 is integrally formed with a top that is an elastic support 41. A receiving chamber 42 is formed under the elastic support 41 and a recess 43 passing through said receiving chamber 42 is formed at a front end of the bar holder 40. Both ends of the sliding bar 33 are inserted through the recess 43 into said receiving chamber 42 of said bar holder 40 shown as FIG. 5.

Each said bar holder 40 is secured on said base 30 with a fixing screw 44. An adjustable screw 45 used to adjust a height of said sliding bar 33 is screwed through said base 30 into said receiving chamber 42 of said bar holder 40 and against said sliding bar 33 to keep an optical pickup 31 with proper parallelism and distance relative to a turning table 34 shown as FIG. 3.

Figure 6:
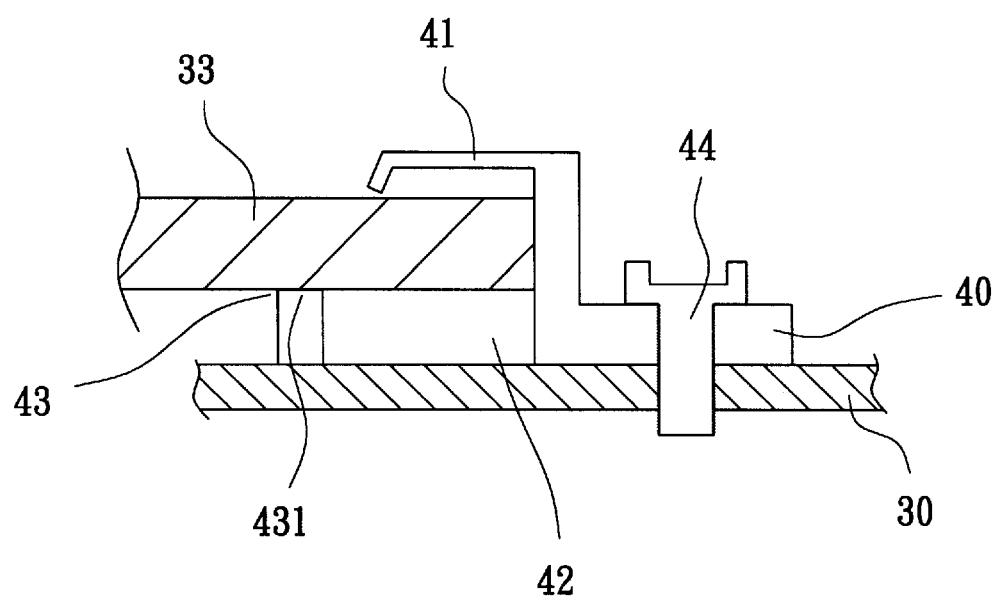
FIG. 6 is a cross-sectional drawing of a bar holder of the traverse of another embodiment of the invention.

Referring to FIG. 6, another embodiment of said bar holder 40 of the invention, wherein the elastic support is used for leveling rather than said adjustable screw to adjust the height of said sliding bar 33. The sliding bar 33 is directly set on a top end 431 of said recess 43 and securely positioned by the elasticity of said elastic support 41.

Figure 2:
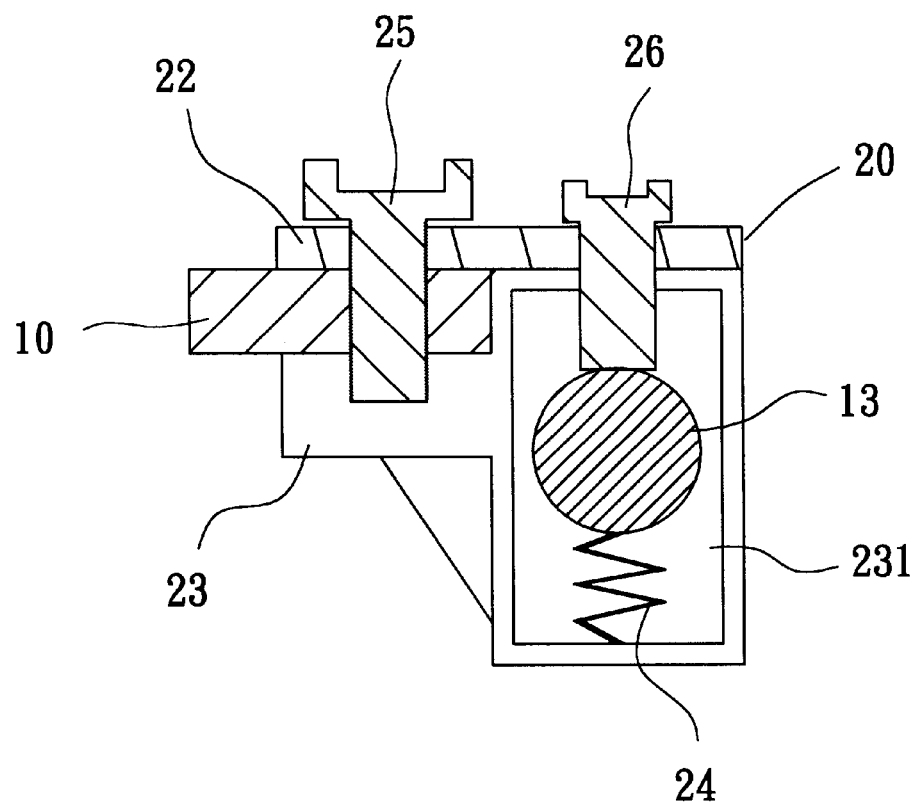
FIG. 2 is a cross-sectional drawing of a adjustable bar holder of the conventional traverse of optical disc apparatus illustrated on FIG. 1.

Accordingly, said bar holder 40 of the invention may satisfy the demand for working parts and cost reduction due to said elastic support 41 being integrally 25 formed therein as a substitute for said spring 24 used in the conventional adjustable bar holder 20 shown as FIG. 2. Said bar holder 40 of the invention is more easily made and assembled than the conventional adjustable bar holder 20. Therefore, the manpower and cost may also be saved.

Figure 1:
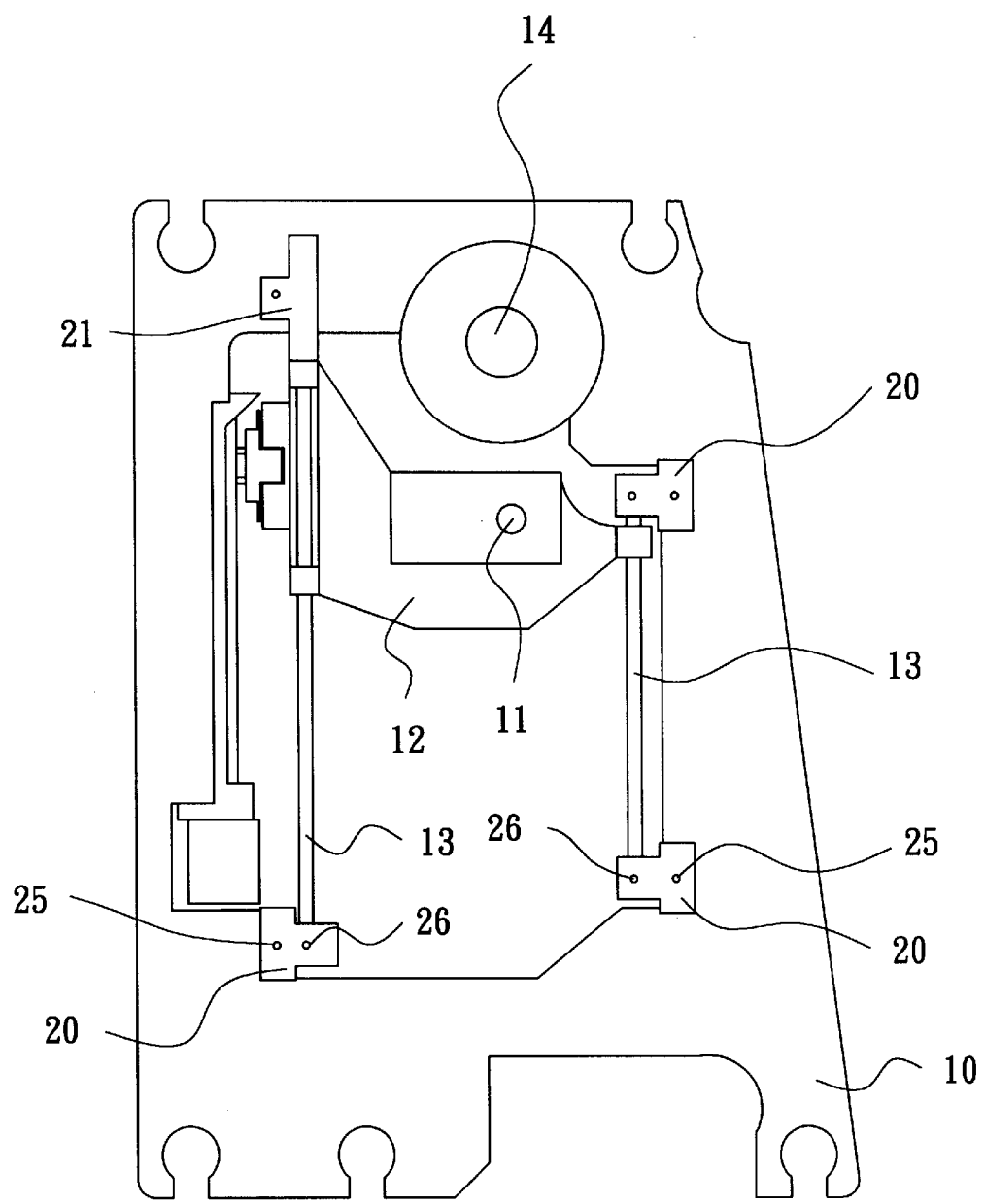
FIG. 1 is an illustrated drawing to show the structure of a conventional traverse of optical disc apparatus.

In additional, said bar holder of the invention and one conventionally used stationary bar holder 21 shown as FIG. 1 can be used together to secure both ends of said sliding bar. Under this kind of combination, the height of said sliding bar is still adjustable due to adjusting said adjustable screw of said bar holder located at one ends of said sliding bar. Moreover, said bar holder of the invention and said base may be integrally formed as one piece of working parts to save more assembling cost.

The scope of this disclosed invention is not limited to the embodiment illustrated as above. Which scope explained and defined by claims may include all changeable equivalents more particularly only changed in easy amendment or variation.

What is claimed is:

1. An adjustable positioning device for an optical pickup of an optical disc apparatus comprising:

a) a base;

b) four bar holders connected to the base, at least one of the bar holders having:

i) an elastic support located on a top thereof;

ii) a receiving chamber located below the elastic support; and iii) a recess located on a front of the at least one bar holder and communicating with the receiving chamber and an exterior of the at least one bar holder, wherein the elastic support, the receiving chamber and the recess are integrally formed as a single piece;

c) two sliding bars, each end of each of the two sliding bars being connected to one of the four bar holders, at least one end of one of the two sliding bars being inserted into the receiving chamber and pressed by the elastic support against the recess, the four bar holders positioning the two sliding bars in parallel; and d) an optical pickup head with an optical pickup, the optical pickup head being slidably connected to each of the two sliding bars.

2. The adjustable positioning device according to claim 1, wherein the at least one bar holder is connected to the base by a fixing screw.

3. The adjustable positioning device according to claim 1, wherein the base and the at least one bar holder are integrally formed as a single piece.

4. The adjustable positioning device according to claim 1, further comprising an adjusting screw connected to the base and protruding into the receiving chamber of the at least one bar holder, the adjusting screw adjustably pressing against and adjusting a height of one of the two sliding bars.

5. The adjustable positioning device according to claim 2, further comprising an adjusting screw connected to the base and protruding into the receiving chamber of the at least one bar holder, the adjusting screw adjustably pressing against and adjusting a height of one of the two sliding bars.

6. The adjustable positioning device according to claim 5, further comprising an adjusting screw connected to the base and protruding into the receiving chamber of the at least one bar holder, the adjusting screw adjustably pressing against and adjusting a height of one of the two sliding bars.

* * * * *